(12) United States Patent
Ito et al.

(10) Patent No.: US 11,892,324 B2
(45) Date of Patent: Feb. 6, 2024

(54) ROTATION ANGLE SENSOR AND METHOD FOR MANUFACTURING ROTATION ANGLE SENSOR

(71) Applicant: DENSO CORPORATION, Kariya (JP)

(72) Inventors: Takeshi Ito, Kariya (JP); Yoshiyuki Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 459 days.

(21) Appl. No.: 17/204,563

(22) Filed: Mar. 17, 2021

(65) Prior Publication Data

US 2021/0199469 A1 Jul. 1, 2021

Related U.S. Application Data

(63) Continuation of application No. PCT/JP2019/031611, filed on Aug. 9, 2019.

(30) Foreign Application Priority Data

Sep. 21, 2018 (JP) .................. 2018-177195

(51) Int. Cl.
*G01D 5/12* (2006.01)
*G01D 11/24* (2006.01)

(52) U.S. Cl.
CPC ............. *G01D 5/12* (2013.01); *G01D 11/245* (2013.01)

(58) Field of Classification Search
CPC ............................... G01D 11/245; G01D 5/12
See application file for complete search history.

(56) References Cited

U.S. PATENT DOCUMENTS

| 2012/0038350 A1 | 2/2012 | Bender et al. |
| 2016/0265946 A1* | 9/2016 | Mase ............... G01D 11/30 |
| 2017/0223855 A1 | 8/2017 | Suzuki et al. |
| 2019/0170499 A1 | 6/2019 | Ito et al. |

FOREIGN PATENT DOCUMENTS

| EP | 2 487 351 | 9/2015 |
| JP | 62-156880 | * 10/1987 |
| JP | 2018-046200 | 3/2018 |

* cited by examiner

*Primary Examiner* — Alesa Allgood
(74) *Attorney, Agent, or Firm* — Nixon & Vanderhye P.C.

(57) ABSTRACT

A rotation angle sensor includes a sensor integrated circuit attached to an attachment member. The attachment member includes a connecting terminal protruding upward from an attachment surface and a guide protruding upward from the attachment surface and positions, together with the connecting terminal, the sensor integrated circuit at an attachment position. The sensor integrated circuit includes a lead frame on which an electronic circuit is mounted and an exterior covering the electronic circuit. The lead frame includes a lead and an extending portion located in an outer periphery of the exterior. At least one of the lead and the extending portion has an elastic structure. The sensor integrated circuit is attached to the attachment member by an elastic force of the elastic structure that biases the extending portion against the guide and that joins the lead to the connecting terminal.

10 Claims, 14 Drawing Sheets

ROTATION ANGLE SENSOR AND METHOD FOR MANUFACTURING ROTATION ANGLE SENSOR

CROSS REFERENCE TO RELATED APPLICATION

The present application is a continuation application of International Patent Application No. PCT/JP2019/031611 filed on Aug. 9, 2019, which designated the U.S. and claims the benefit of priority from Japanese Patent Application No. 2018-177195 filed on Sep. 21, 2018. The entire disclosures of all of the above applications are incorporated herein by reference.

TECHNICAL FIELD

The present disclosure relates to a rotation angle sensor configured to detect a rotation angle of a shaft and a method for manufacturing the rotation angle sensor.

BACKGROUND ART

A rotation angle sensor has a configuration in which a sensor module is housed in a supporter module. The supporter module includes at least two domes and the sensor module is disposed between the two domes.

SUMMARY

A rotational angle sensor is configured to detect a rotation angle of a shaft is provided. The rotational angle sensor includes an attachment member and a sensor integrated circuit attached to the attachment member. The attachment member has an attachment surface on which the sensor integrated circuit is installed. The attachment member further includes a connecting terminal protruding upward from the attachment surface and a guide protruding upward from the attachment surface and configured to position, together with the connecting terminal, the sensor integrated circuit at an attachment position. The sensor integrated circuit has a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. At least one of the lead and the extending portion has an elastic structure. The sensor integrated circuit is attached to the attachment member by an elastic force generated from the elastic structure that biases a portion of the extending portion against the guide and that joins the lead to the connecting terminal.

A method for manufacturing a rotation angle sensor configured to detect a rotation angle of a shaft is provided. The rotation angle sensor includes an attachment member, a sensor integrated circuit attached to the attachment member. The attachment member has an attachment surface to which the sensor integrated circuit is attached. The attachment member includes a connecting terminal that protrudes upward from the attachment surface and a guide that protrudes upward from the attachment surface and is configured to position, together with the connecting terminal, the sensor integrated circuit at an attachment position. The sensor integrated circuit includes a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. The method for manufacturing the rotation angle sensor includes (a) a forming step of forming an elastic structure at at least one of the lead and the extending portion and (b) an attachment step of setting the sensor integrated circuit at the attachment position on the attachment surface such that a lower surface of the sensor integrated circuit is brought into contact with the attachment surface whereby the extending portion is biased against the guide and the lead is joined to the connecting terminal by an elastic force generated when the elastic structure is deformed.

A method for manufacturing a rotation sensor configured to detect a rotation angle of a shaft is provided. The rotation angle sensor includes an attachment member and a sensor integrated circuit attached to the attachment member. The attachment member has an attachment surface to which the sensor integrated circuit is attached. The attachment member includes a connecting terminal that protrudes upward from the attachment surface and a guide that protrudes upward from the attachment surface and positions, together with the connecting terminal, the sensor integrated circuit at an attachment position. The sensor integrated circuit includes a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. The method for manufacturing the rotation angle sensor includes (a) a bending step, (b) a positioning step, and (c) a bending step. The bending step includes bending a distal end portion of the lead toward an upper surface of the sensor integrated circuit such that the distal end portion of the lead is brought into contact with a wall surface of the connecting terminal when the sensor integrated circuit is positioned at the attachment position. The positioning step includes setting the sensor integrated circuit at the attachment position on the attachment surface such that a lower surface of the sensor integrated circuit faces the attachment surface and the distal end portion of the lead is brought into contact with the connecting terminal. The bending step includes bending the connecting terminal and the distal end portion of the lead to define an acute angle between the distal end portion and a proximal end portion of the lead while the connecting terminal is in contact with the distal end portion of the lead. Whereby, the distal end portion of the lead is biased against the connecting terminal and the lead is joined to the connecting terminal by an elastic force generated when the distal end portion of the lead is bent.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
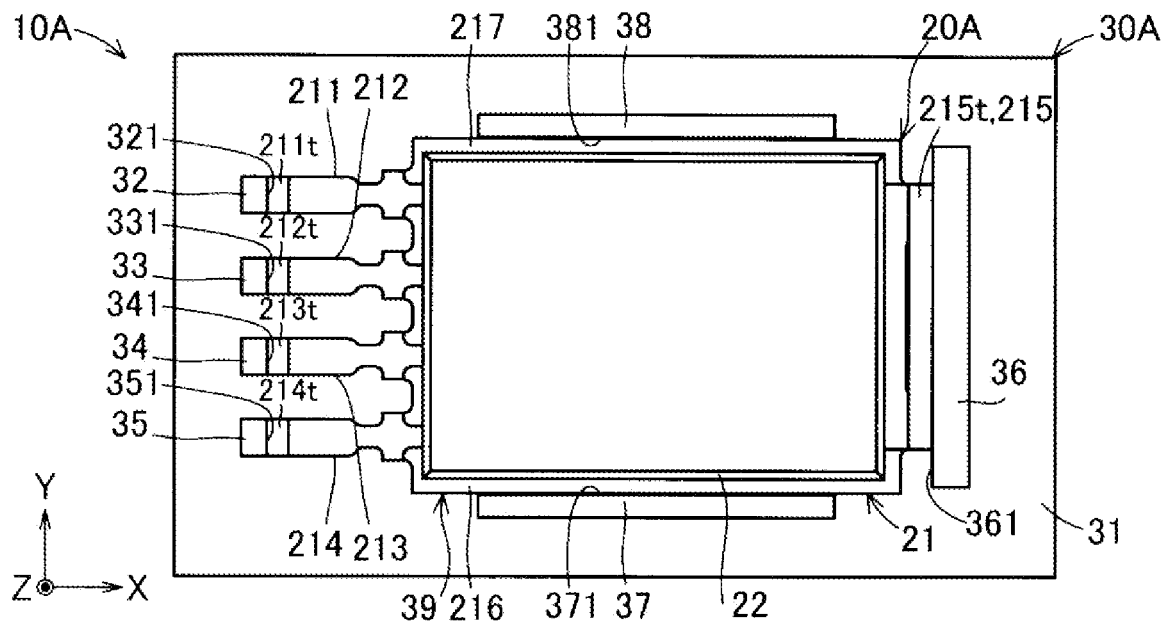
FIG. 1 is a plan view of a rotation angle sensor in a first embodiment.

To begin with, examples of relevant techniques will be described.

A rotation angle sensor has a configuration in which a sensor module is housed in a supporter module. The sensor module is an Integrated Circuit (i.e., IC) including a lead frame and an injection molding portion. Electronic components of the rotational angle sensor are installed on the lead frame and electrically connected to the lead frame. The injection molding portion is made of plastic and includes at least an electrical component. The supporter module includes an electrical terminal that is conductively connected to an electrical terminal of the sensor module. The supporter module includes at least two domes and the sensor module is disposed between the two domes. Each of the two domes has a free end that is deformed to interpose the sensor module at a point therebetween. The sensor module is fixed to the supporter module with this configuration.

Here, when a rotation angle sensor is used as a throttle position sensor of a vehicle under a harsh condition that has a wide temperature range (e.g., −40° C. to +140° C.), a backlash may be generated between the supporter module and the sensor module. The backlash is caused by a difference of a liner expansion coefficient between a member forming the supporter module and the lead frame of the sensor module interposed between the two domes. This backlash may displace the sensor module by vibrations and the like, and may change an output of the rotation angle sensor.

According to an aspect of the present disclosure, a rotational angle sensor configured to detect a rotation angle of a shaft is provided. The rotational angle sensor includes an attachment member and a sensor integrated circuit attached to the attachment member. The attachment member has an attachment surface on which the sensor integrated circuit is installed. The attachment member further includes a connecting terminal protruding upward from the attachment surface and a guide protruding upward from the attachment surface and configured to position, together with the connecting terminal, the sensor integrated circuit at an attachment position. The sensor integrated circuit has a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. At least one of the lead and the extending portion has an elastic structure. The sensor integrated circuit is attached to the attachment member by an elastic force generated from the elastic structure that biases a portion of the extending portion against the guide and that joins the lead to the connecting terminal.

According to the rotation angle sensor in the above embodiment, the sensor integrated circuit can be attached to the attachment position by the elastic force of the at least one of the lead and the extending portion. Thus, a backlash generated by change in a temperature around the rotation angle sensor can be suppressed.

According to another aspect of the present disclosure, a method for manufacturing a rotation angle sensor configured to detect a rotation angle of a shaft is provided. The rotation angle sensor includes an attachment member, a sensor integrated circuit attached to the attachment member. The attachment member has an attachment surface to which the sensor integrated circuit is attached. The attachment member includes a connecting terminal that protrudes upward from the attachment surface and a guide that protrudes upward from the attachment surface and is configured to position, together with the connecting terminal, the sensor integrated circuit at an attachment position. The sensor integrated circuit includes a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. The method for manufacturing the rotation angle sensor includes (a) a forming step of forming an elastic structure at at least one of the lead and the extending portion and (b) an attachment step of setting the sensor integrated circuit at the attachment position on the attachment surface such that a lower surface of the sensor integrated circuit is brought into contact with the attachment surface whereby the extending portion is biased against the guide and the lead is joined to the connecting terminal by an elastic force generated when the elastic structure is deformed.

According to the method for manufacturing the rotation angle sensor in this aspect, the sensor integrated circuit is attached to the attachment position by the elastic force generated by the elastic structure of at least one of the lead and the extending portion. Therefore, a backlash caused by a change in a temperature around the rotation angle sensor can be suppressed.

According to another aspect of the present disclosure, a method for manufacturing a rotation sensor configured to detect a rotation angle of a shaft is provided. The rotation angle sensor includes an attachment member and a sensor integrated circuit attached to the attachment member. The attachment member has an attachment surface to which the sensor integrated circuit is attached. The attachment member includes a connecting terminal that protrudes upward from the attachment surface and a guide that protrudes upward from the attachment surface and positions, together with the connecting terminal, the sensor integrated circuit at an attachment position. The sensor integrated circuit includes a lead frame on which an electronic circuit for detecting the rotation angle is mounted and an exterior that covers the electronic circuit. The lead frame includes a lead configured to guide a terminal of the electronic circuit from an inside to an outside of the exterior, and an extending portion located in at least a portion of an outer periphery of the exterior. The method for manufacturing the rotation angle sensor includes (a) a bending step, (b) a positioning step, and (c) a bending step. The bending step includes bending a distal end portion of the lead toward an upper surface of the sensor integrated circuit such that the distal end portion of the lead is brought into contact with a wall surface of the connecting terminal when the sensor integrated circuit is positioned at the attachment position. The positioning step includes setting the sensor integrated circuit at the attachment position on the attachment surface such that a lower surface of the sensor integrated circuit faces the attachment surface and the distal end portion of the lead is brought into contact with the connecting terminal. The bending step includes bending the connecting terminal and the distal end portion of the lead to define an acute angle between the distal end portion and a proximal end portion of the lead while the connecting terminal is in contact with the distal end portion of the lead. Whereby, the distal end portion of the lead is biased against the connecting terminal and the lead is joined to the connecting terminal by an elastic force generated when the distal end portion of the lead is bent.

According to the method for manufacturing the rotation angle sensor in this aspect, the sensor integrated circuit can be attached to the attachment position by the elastic force of the lead. Thus, the backlash caused by a change in the temperature around the rotation angle sensor is restricted from generating.

A. First Embodiment

Figure 2:
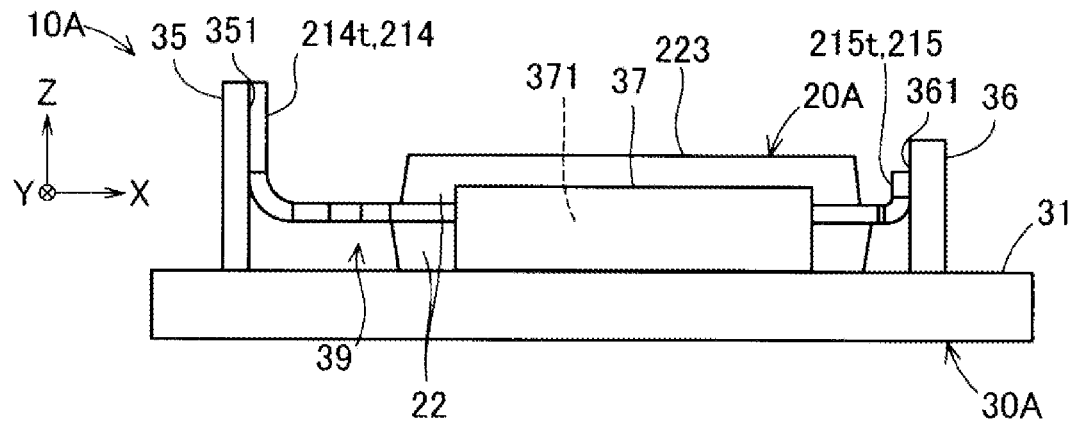
FIG. 2 is a front view of the rotation angle sensor in FIG. 1.
Figure 3:
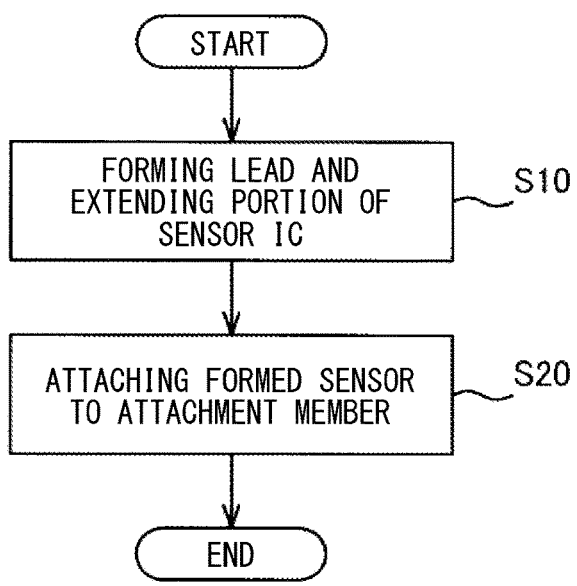
FIG. 3 is a flowchart of steps of manufacturing the rotation angle sensor.
Figure 6:
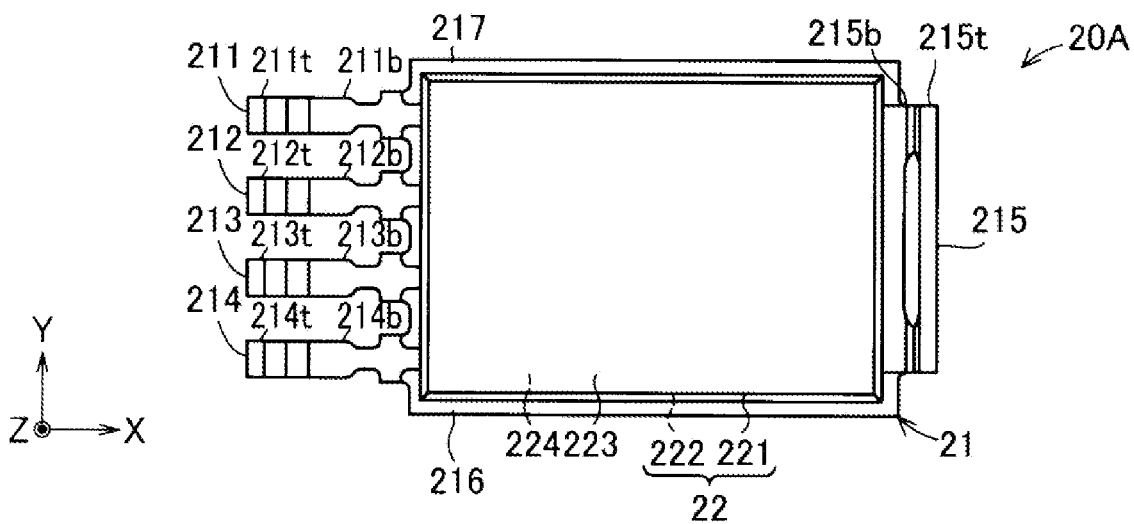
FIG. 6 is a front view of a formed sensor integrated circuit.
Figure 7:
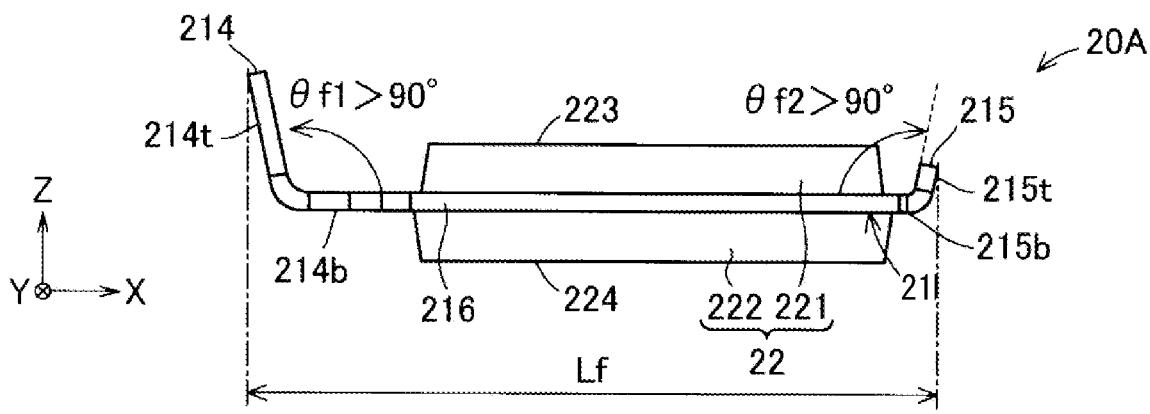
FIG. 7 is a front view of the formed sensor integrated circuit in FIG. 6.
Figure 8:
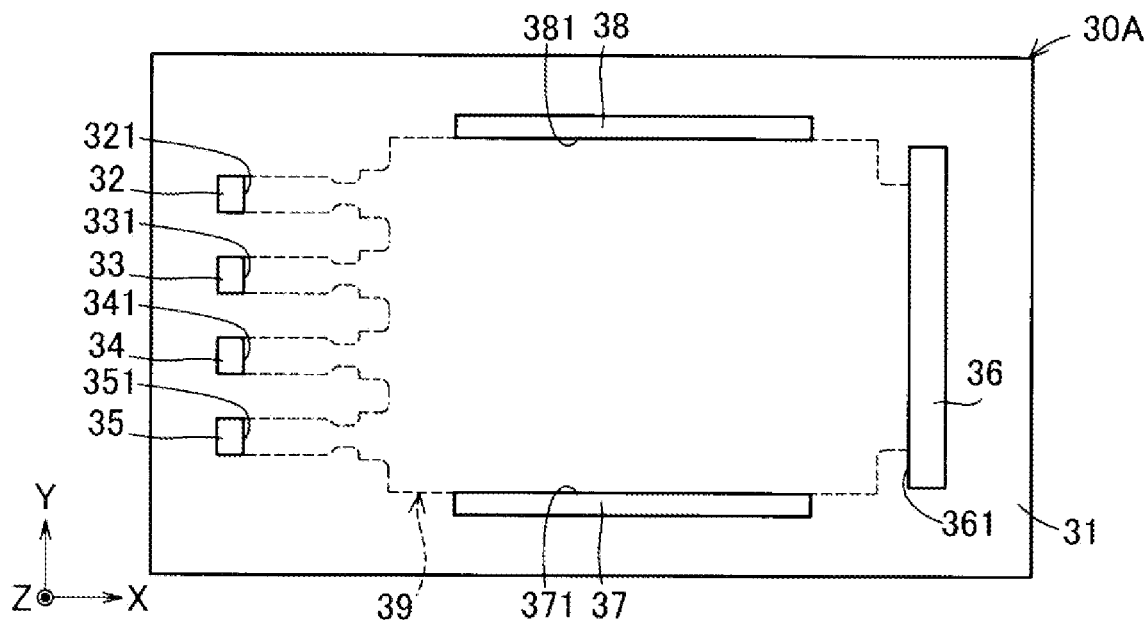
FIG. 8 is a plan view of an attachment member.
Figure 9:
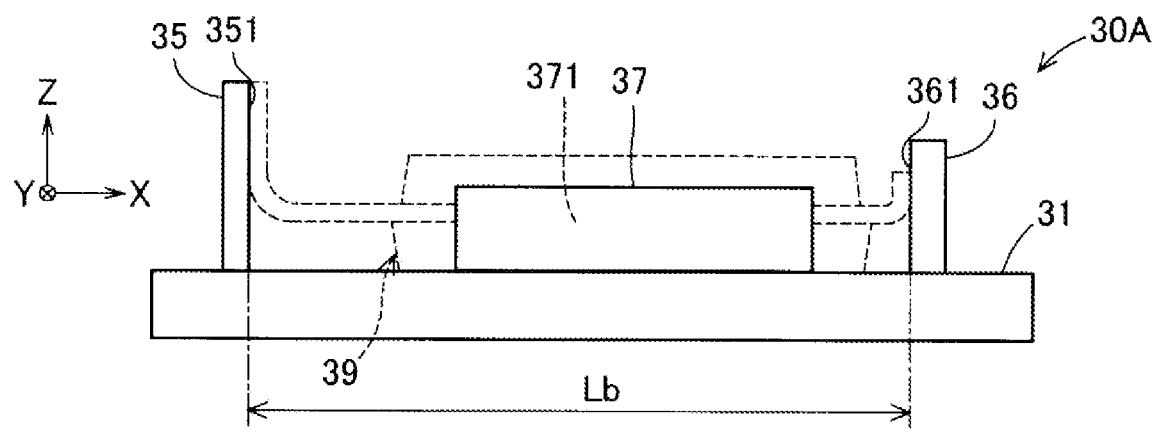
FIG. 9 is a front view of the attachment member in FIG. 8.

A rotation angle sensor 10A of a first embodiment shown in FIGS. 1 and 2 is formed by attaching a sensor integrated circuit (i.e., a sensor IC) 20A shown in FIGS. 6 and 7 to an attachment member 30A shown in FIGS. 8 and 9 in accordance with step S10 and step S20 shown in FIG. 3. The rotation angle sensor 10A is configured to detect a rotation angle of a shaft and used for various controls that are performed in accordance with the rotation angle detected by the rotation angle sensor 10A. The various controls are for example a throttle control of an internal combustion engine of a vehicle, an EGR control, and the like.

The attachment member 30A is generally configured as a cover member of a measurement target device such as a throttle valve unit controlled by the throttle control. The cover member is made of a resin and covers a position at which the rotation angle sensor 10A is mounted.

The sensor IC 20A is an integrated circuit (i.e., IC) on which multiple electronic components configuring an electronic circuit for detecting the rotation angle of the shaft are mounted. The sensor IC 20A is also referred to as a sensor module.

Figure 4:
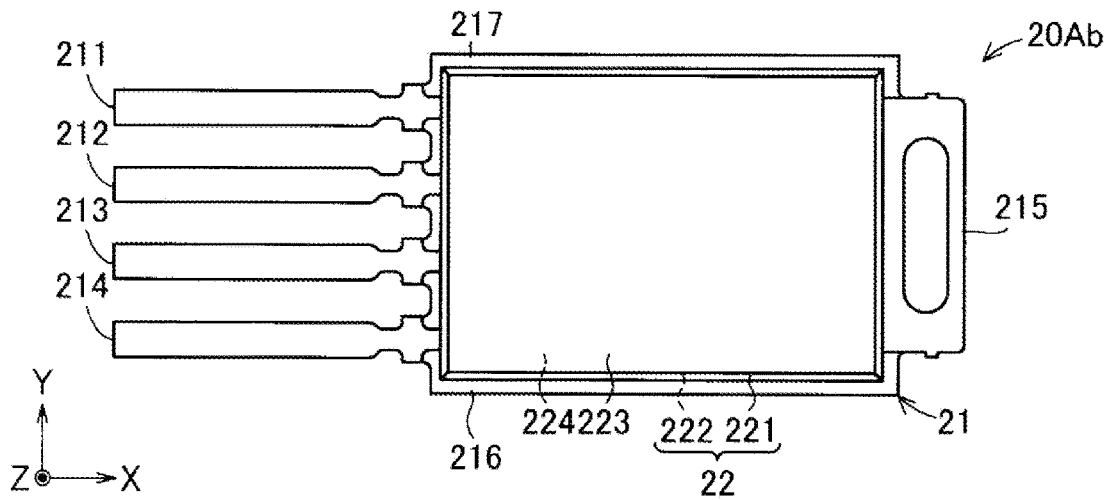
FIG. 4 is a plan view of a sensor integrated circuit.
Figure 5:
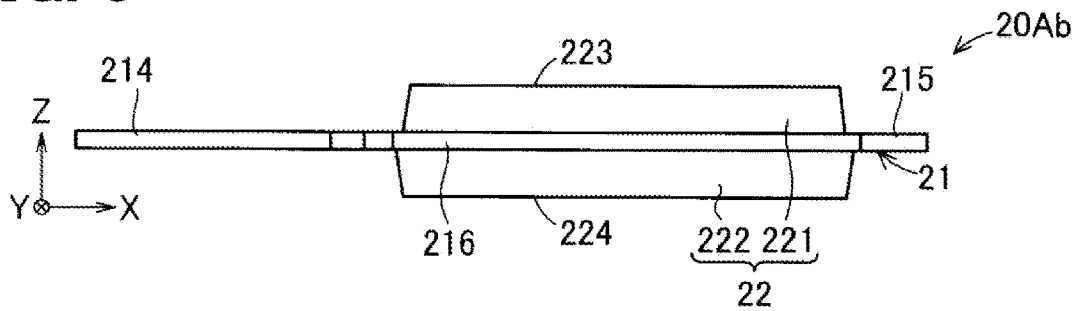
FIG. 5 is a front view of the sensor integrated circuit.

As shown in FIGS. 4 and 5, a sensor IC 20Ab that has not been formed has a lead frame 21 that is made of metal. The lead frame 21 has thereon an electronic component configuring an electronic circuit (not shown) to detect the rotation angle of the shaft. The electronic component is covered with an exterior 22. The exterior 22 has an upper exterior portion 221 covering an upper surface of the lead frame 21 and a lower exterior portion 222 covering a lower surface of the lead frame 21 such that the exterior 22 sandwiches the lead frame 21 in an up-down direction. The exterior 22 is made of a resin.

The lead frame 21 has leads 211-214 and extending portions 215, 216, and 217. The leads 211-214 protrude from one side surface of the exterior 22 and extend in an in-plane direction. The extending portions 215, 216, 217 protrude from the other side surfaces of the exterior 22 in the in-plane direction and are disposed in an outer periphery of the exterior 22. The leads 211-214 are conductive members to guide terminals of the electronic circuit to an external member. The extending portion 215 protrudes from an end of the exterior 22 that is opposite to an end of the exterior 22 from which the leads 211-214 protrude in a direction opposite to an extending direction of the leads 211-214. Hereinafter, the extending portion 215 is referred to as "an opposite extending portion 215". The extending portions 216 and 217 protrude in directions perpendicular to the protruding direction of the opposite extending portion 215. Hereinafter, the extending portions 216 and 217 are referred to as "perpendicular extending portions 216 and 217".

In FIGS. 4 and 5, +X direction is a direction from distal end portions to proximal end portions of the leads 211-214 extending in the in-plane direction of the lead frame 21. +Z direction is a direction from a lower surface 224 of the lower exterior portion 222 to an upper surface 223 of the upper exterior portion 221. +Y direction is a direction perpendicular to both of the +X direction and the +Z direction and from the perpendicular extending portion 216 to the perpendicular extending portion 217. The +X, +Y, and +Z directions are the same in other drawings.

As shown in FIGS. 8 and 9, the attachment member 30A has multiple connecting terminals 32-35 and guides 36-38. The attachment member 30A has an attachment surface 31 and the sensor IC 20A is attached to an attachment position 39 on the attachment surface 31. The connecting terminals 32-35 and the guides 36-38 are disposed in end portions of the attachment position 39. The connecting terminals 32-35 are terminals electrically connected to the leads 211-214 (see FIGS. 6 and 7) of the sensor IC 20A. The guides 36-38 are configured to guide, together with the connecting terminals 32-35, the sensor IC 20A to the attachment position 39.

Each of the connecting terminals 32-35 has a terminal surface 321, 331, 341, 351 that protrudes upward (i.e., in the +Z direction) from the attachment surface 31. As will be described later, when the sensor IC 20A is attached as shown in FIGS. 1 and 2, the leads 211-214 (see FIGS. 6 and 7) are joined to and electrically connected to the terminal surfaces 321, 331, 341, and 351. In FIG. 8, the connecting terminals 32-35 are disposed such that the connecting terminals 32-35 are in contact with a left end of the attachment position 39 and arranged in this order downward in the −Y direction. The connecting terminals 32-35 can be connected to a control device using the sensor IC 20A through a wire cable connected to a connector (not shown).

The guide 36 is disposed in an end portion of the attachment position 39 facing the end portion of the attachment position 39 at which the connecting terminals 32-35 are disposed. The guide 36 protrudes upward (i.e., in the +Z direction) from the attachment surface 31 and has a wall surface 361 facing the connecting terminals 32-35 (i.e., facing in the −X direction). When the sensor IC 20A is attached as shown in FIGS. 1 and 2, the wall surface 361 is brought into contact with the opposite extending portion 215 (see FIGS. 6 and 7) and thereby serves as a guide surface to guide the sensor IC 20A to the attachment position 39.

The guides 37 and 38 are respectively dispose in both end portions of the attachment position 39 in the direction perpendicular to a facing direction of the connecting terminals 32-35 and the guide 36 (i.e., the Y direction). The guides 37 and 38 protrude upward (i.e., in the +Z direction) from the attachment surface 31 and respectively have wall surfaces 371, 381 facing each other. As will be described later, when the sensor IC 20A is attached as shown in FIGS. 1 and 2, the wall surfaces 371 and 381 are brought into contact with the perpendicular extending portions 216 and 217 (see FIGS. 6 and 7), thereby the wall surfaces 371 and 381 serve as guide surfaces to guide the sensor IC 20A to the attachment position 39.

In step S10 of FIG. 3, the sensor IC 20Ab that has not been formed (see FIGS. 4 and 5) is formed into a shape such that the sensor IC 20A is attachable to the attachment position 39 of the attachment member 30A shown in FIGS. 8 and 9. Thereby, the sensor IC 20A shown in FIGS. 6 and 7 that is attachable to the attachment member 30A is formed.

As shown in FIGS. 6 and 7, distal end portions 211t-214t of the leads 211-214 are bent toward the upper surface 223 of the sensor IC 20A (i.e., in the +Z direction) such that an angle θf1 between the distal end portions 211t-214t and proximal end portions 211b-214b of the leads 211-214 is an obtuse angle (>90°). Similarly, a distal end portion 215t of the opposite extending portion 215 is bent in the +Z direction such that an angle θf2 between the distal end portion 215t and a proximal end portion 215b is an obtuse angle. At this time, a length Lf between an outer end of the distal end portions 211t-214t of the leads 211-214 and an outer end of the distal end portion 215t of the opposite extending portion 215 in the front view of the FIG. 7 is set to a value longer than a length Lb between the terminal surfaces 321, 331, 341, 351 of the connecting terminals 32-35 and the wall surface 361 of the guide 36. As will be described later, this is because to form an elastic structure at the leads 211-214 and the opposite extending portion 215 for press-fitting the sensor IC 20A to the attachment position 39 located between the connecting terminals 32-35 and the guide 36 when the sensor IC 20A is attached to the attachment member 30A.

In step S20 of FIG. 3, the formed sensor IC 20A (see FIGS. 6 and 7) formed in step S10 is set at the attachment position 39 of the attachment member 30A shown in FIGS. 8 and 9. As a result, the rotation angle sensor 10A shown in FIGS. 1 and 2 are manufactured.

Figure 10:
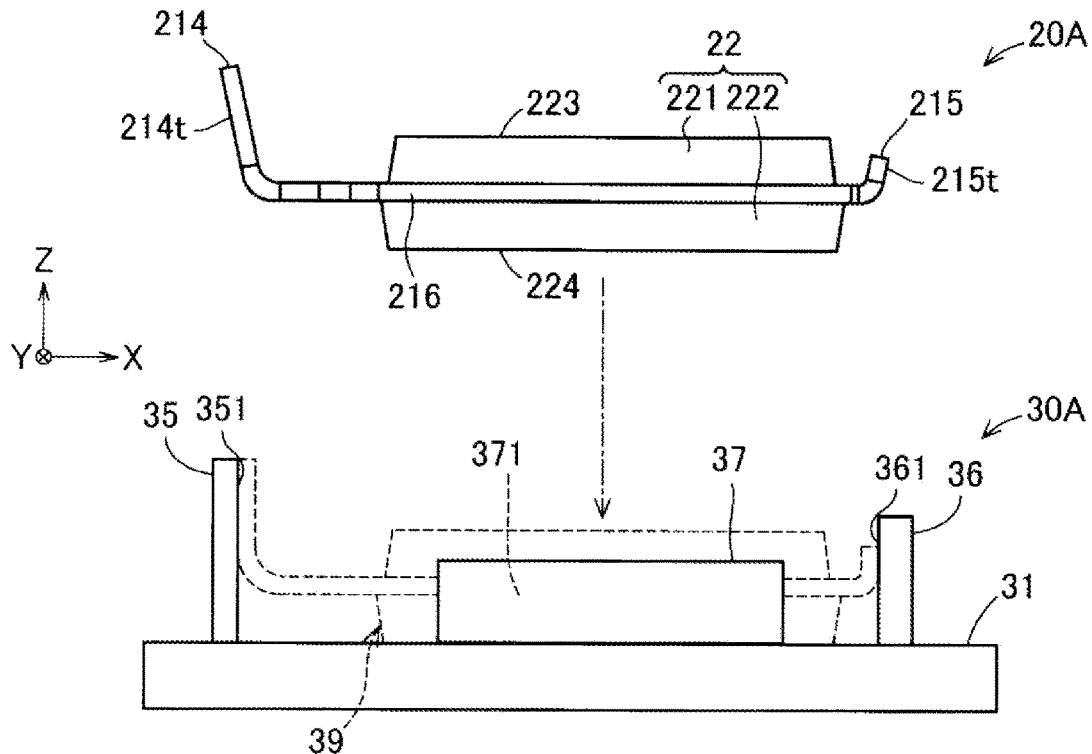
FIG. 10 is a diagram illustrating an attachment of the sensor integrated circuit to the attachment member.

Specifically, as shown in FIG. 10, the sensor IC 20A is firstly disposed above the attachment position 39 such that a lower surface 224 of the sensor IC 20A faces the attachment surface 31 of the attachment member 30A. In this time, the position of the sensor IC 20A is set such that the perpendicular extending portions 216, 217 of the lead frame 21 are brought into contact with the wall surfaces 371, 381 of the guides 37, 38, the opposite extending portion 215 of the lead frame 21 is brought into contact with the wall surface 361 of the guide 36, and the leads 211-214 are brought into contact with the connecting terminals 32-35. Then, the sensor IC 20A is pressed against the attachment surface 31 to set the sensor IC 20A at the attachment position 39. In this time, the sensor IC 20A is press-fit to the attachment position 39 such that the distal end portions 211t-214t of the leads 211-214 are brought into contact with the terminal surfaces 321,331,341,351 of the connecting terminals 32-35 and the distal end portion 215t of the opposite extending portion 215 is brought into contact with the wall surface 361 of the guide 36. Thereby, the sensor IC 20A is attached to the attachment position 39.

The distal end portions 211t-214t of the leads 211-214 are biased against the terminal surfaces 321, 331, 341, 351 of the connecting terminals 32-35 and the distal end portion 215t of the opposite extending portion 215 is biased against the wall surface 361 of the guide 36 by the elastic force of the above-described elastic structure. Thereby, the sensor IC 20A is attached and fixed to the attachment position 39. The distal end portions 211t-214t of the leads 211-214 are joined to the connecting terminals 32-35. The elastic structure formed in the opposite extending portion 215 generates not only a force that biases the opposite extending portion 215 against the wall surface 361 of the guide 36 in the +X direction but also a force that biases the opposite extending portion 215 against the wall surface 361 in the −Z direction. The force that biases the opposite extending portion 215 in the −Z direction may cause the sensor IC 20A to move upward and slip out of the attachment position 39. However, the force that biases the opposite extending portion 215 in the +X direction causes the distal end portion 215t to enter into the wall surface 361 and restricts the force moving the sensor IC 20A upward. Thus, the sensor IC 20A can be fixed at the attachment position 39.

As described above, the distal end portions 211t-214t of the leads 211-214 are biased against and joined to the terminal surfaces 321, 331, 341, 351 of the connecting terminals 32-35 by the elastic force generated from the elastic structure of the leads 211-214. In addition, the distal end portion 215t of the opposite extending portion 215 is biased against the wall surface 361 of the guide 36 by the elastic force generated from the elastic structure of the opposite extending portion 215. In this case, if a change in dimensions of the lead frame 21 occurs due to a change in the temperature around the rotation angle sensor 10A, specifically if there is a difference between an amount of change in length between the distal end portions 211t-214t of the leads 211-214 and the distal end portion 215t of the opposite extending portion 215 and an amount of change in length between the connecting terminals 32-35 of the attachment member 30A and the guide 36, an elastic force in accordance with the difference will be generated. As a result, a backlash is restricted from generating and the sensor IC 20A can be fixed to the attachment position 39.

The obtuse angles θf1 and θf2 are set to values such that a difference between a deforming amount of the attachment member 30A and a deforming amount of the lead frame 21 of the sensor IC 20A can be corrected by the elastic force from the elastic structure even if the difference occurs due to the temperature change caused by a difference of the liner expansion coefficients of the attachment member 30A and the lead frame 21.

B. Second Embodiment

Figure 11:
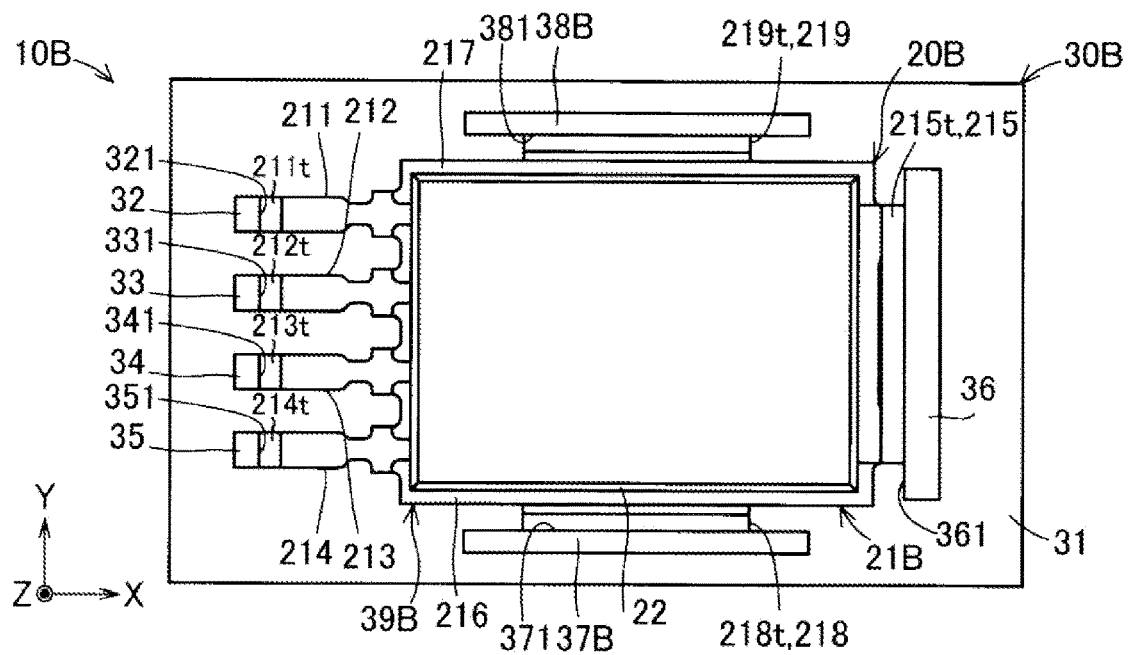
FIG. 11 is a plan view of a rotation angle sensor of a second embodiment.
Figure 12:
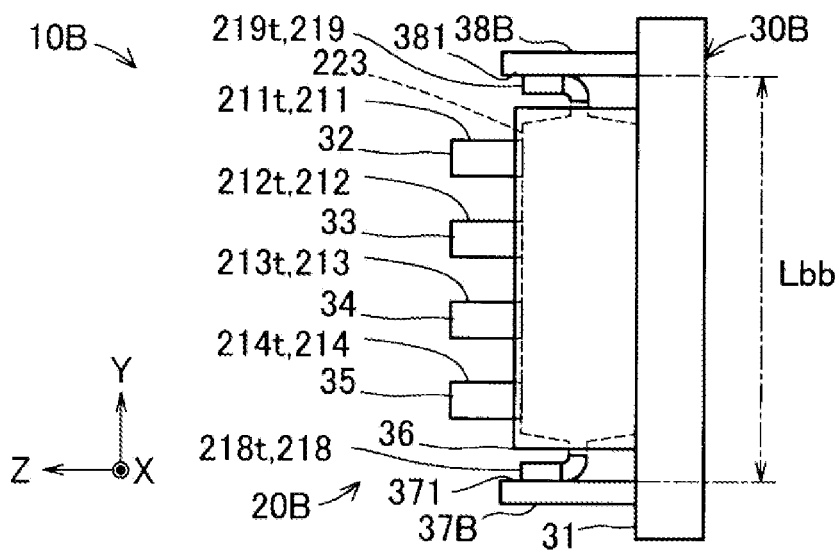
FIG. 12 is a right view of the rotation angle sensor in FIG. 11.

A rotation angle sensor 10B shown in FIGS. 11 and 12 are manufactured in accordance with step S10 and step S20 (see FIG. 3). The rotation angle sensor 10B is manufactured by setting a sensor IC 20B at an attachment member 30B, similarly to the rotation angle sensor 10A in the first embodiment.

A sensor IC 20Bb that has not been formed is different from the sensor IC 20Ab (see FIG. 4) in that the perpendicular extending portions 216, 217 of a lead frame 21B have perpendicular protruding portions 218, 219. As will be described later, the perpendicular protruding portions 218, 219 are bent. Other portions are similar to those of the sensor IC 20Ab.

Figure 13:
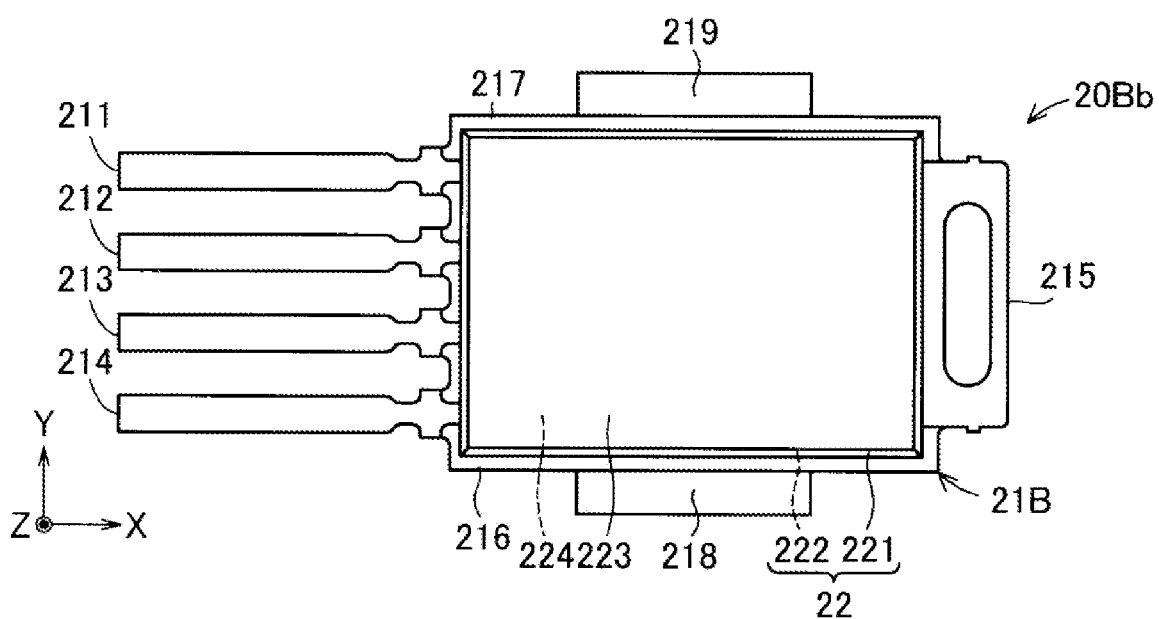
FIG. 13 is a plan view of a sensor integrated circuit.
Figure 14:
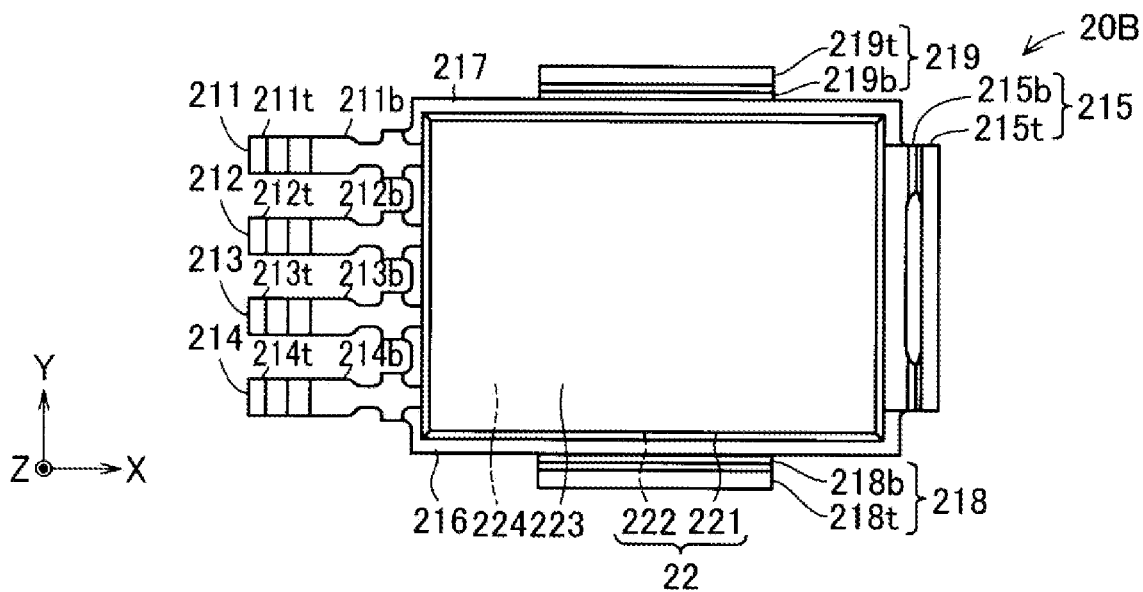
FIG. 14 is a formed sensor integrated circuit.
Figure 15:
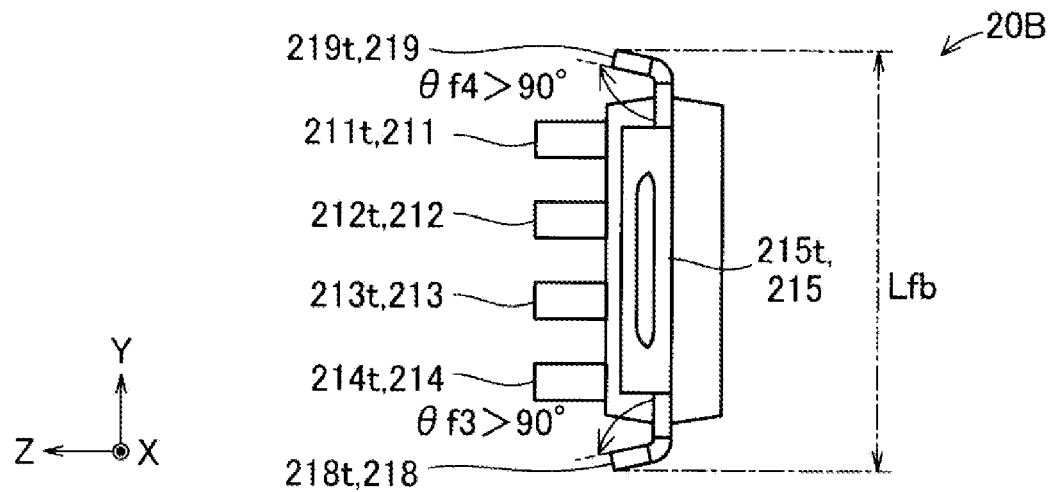
FIG. 15 is a right view of the formed sensor integrated circuit in FIG. 14.

The sensor IC 20B attached to the attachment member 30B is manufactured by forming the sensor IC 20Bb (see FIG. 13) into a shape shown in FIGS. 14 and 15 in step S10 (see FIG. 3).

In addition to bending the leads 211-214 and the opposite extending portion 215, distal end portions 218t and 219t of the perpendicular protruding portions 218 and 219 are bent in the +Z direction. Specifically, the distal end portions 218t and 219t of the perpendicular protruding portions 218, 219 are bent such that an angle θf3 between the distal end portion 218t and a proximal end portion 218b of the perpendicular protruding portion 218 and an angle θf4 between the distal end portion 219t and a proximal end portion 219b of the perpendicular protruding portion 219 are obtuse angles. In addition, a length Lfb between an outer end of the distal end portion 218t of the perpendicular protruding portion 218 and an outer end of the distal end portion 219t of the perpendicular protruding portion 219 in the side view of FIG. 15 is set to a value longer than a length Lbb between the wall surface 371 of the guide 37B and the wall surface 381 of the guide 38B. This is because to form elastic structures at the perpendicular protruding portions 218, 219 of the perpendicular extending portion 216, 217 similarly to the leads 211-214 and the opposite extending portion 215.

As shown in FIG. 12, heights of the guides 37B and 38B of the attachment member 30B are higher than the heights of the guides 37 and 38 (see FIG. 7) such that the guides 37B and 38B can be brought into contact with the distal end portions 218t and 219t of the perpendicular protruding portions 218, 219.

In step S20 (see FIG. 3), the distal end portions 218t and 219t of the perpendicular protruding portions 218 and 219 are biased against wall surfaces 371, 381 of the guides 37B, 38B by the elastic force from the elastic structures when the sensor IC 20B is press-fit to the attachment position 39B. Thereby, the sensor IC 20B can be attached to and fixed to the attachment position 39B similarly to the case in which the leads 211-214 and the opposite extending portion 215 have the elastic structures.

As described above, the rotation angle sensor 10B of the second embodiment has the elastic structures at the leads 211-214 and the opposite extending portion 215 similarly to that of the first embodiment. Thus, similar advantages to those of the first embodiment can be obtained. In addition, the distal end portions 218t and 219t of the perpendicular protruding portions 218 and 219 are biased against the wall surfaces 371 and 381 of the guides 37B and 38B by the elastic structure of the perpendicular protruding portions 218, 219 of the perpendicular extending portions 216 and 217. Thus, even if an amount of change in a dimension between the perpendicular extending portions 216 and 217 of the lead frame 21B is different from an amount of change in a distance between the guides 37B and 38B of the attachment member 30B when the temperature around the rotation angle sensor 10B is changed, an elastic force in accordance with the difference of the changes is generated. Thus, a backlash can be restricted from generating and the sensor IC 20B can be fixed to the attachment position 39B.

The obtuse angles θf3 and θf4 are set to values that can generate the elastic force even if a deformation is occurred due to a difference of the liner expansion coefficients between the attachment member 30B and the lead frame 21 of the sensor IC 20B, similarly to the angles θf1 and θf2.

C. Third Embodiment

Figure 16:
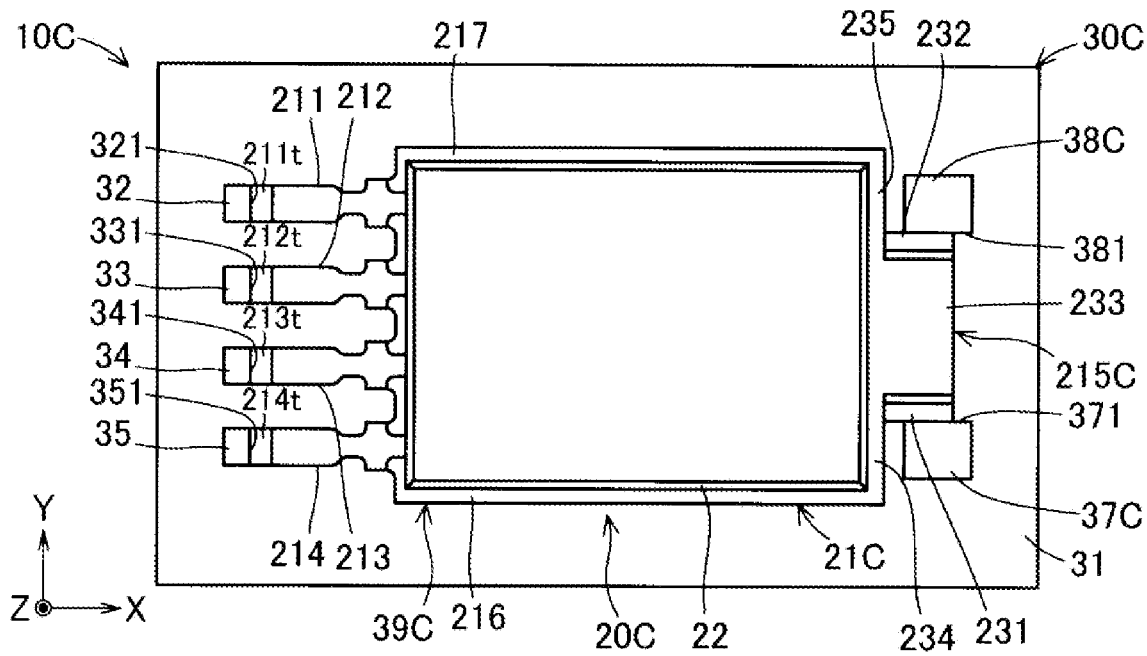
FIG. 16 is a plan view of a rotation angle sensor of a third embodiment.
Figure 17:
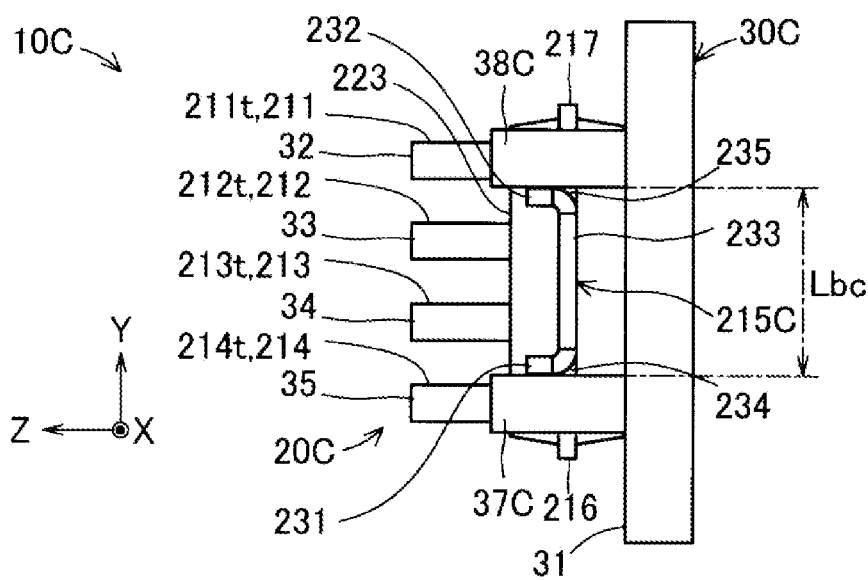
FIG. 17 is a right view of the rotation angle sensor in FIG. 16.

A rotation angle sensor 10C of a third embodiment shown in FIGS. 16 and 17 is manufactured in accordance with step S10 and step S20 (see FIG. 3). The rotation angle sensor 10C is manufactured by attaching a sensor IC 20C to an attachment member 30C shown in FIGS. 18 to 20, similarly to the rotation angle sensor 10A of the first embodiment (see FIGS. 1 and 2).

Figure 18:
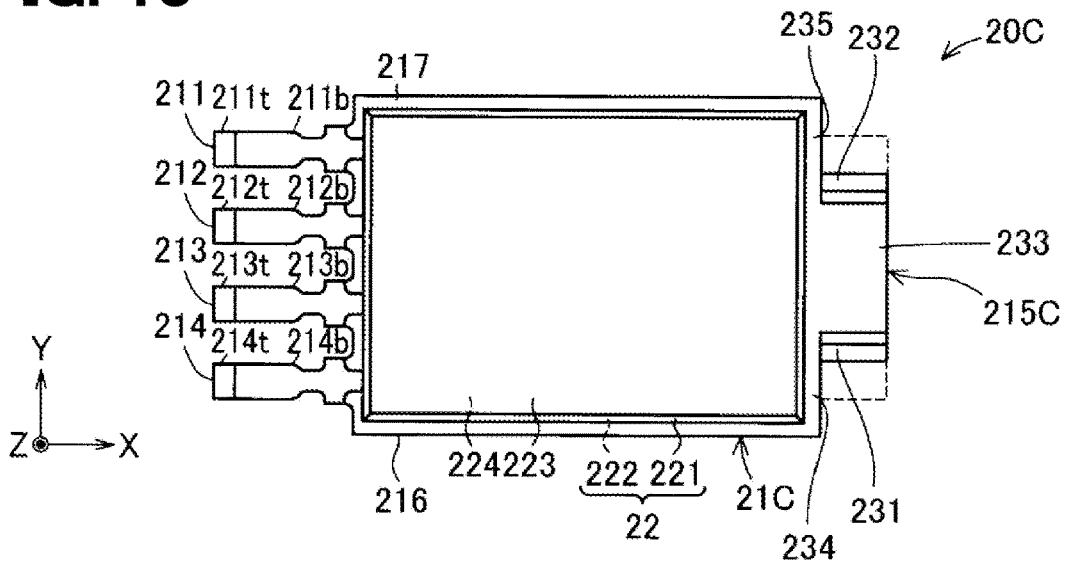
FIG. 18 is a plan view of a formed sensor integrated circuit.
Figure 19:
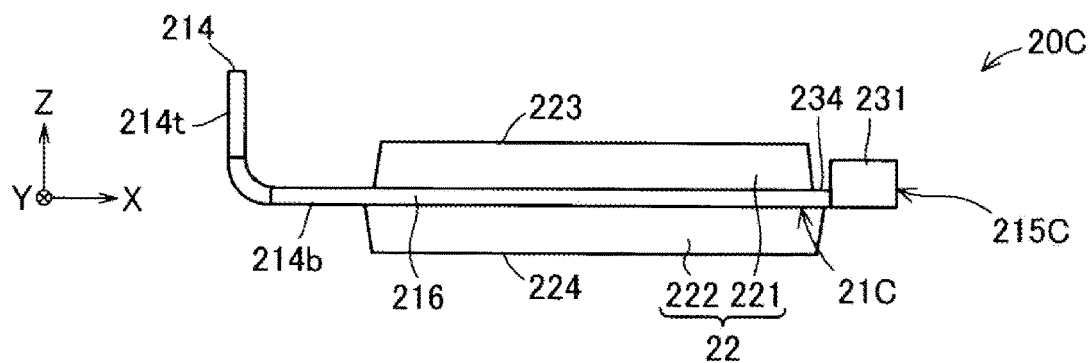
FIG. 19 is a front view of the formed sensor integrated circuit in FIG. 18.
Figure 20:
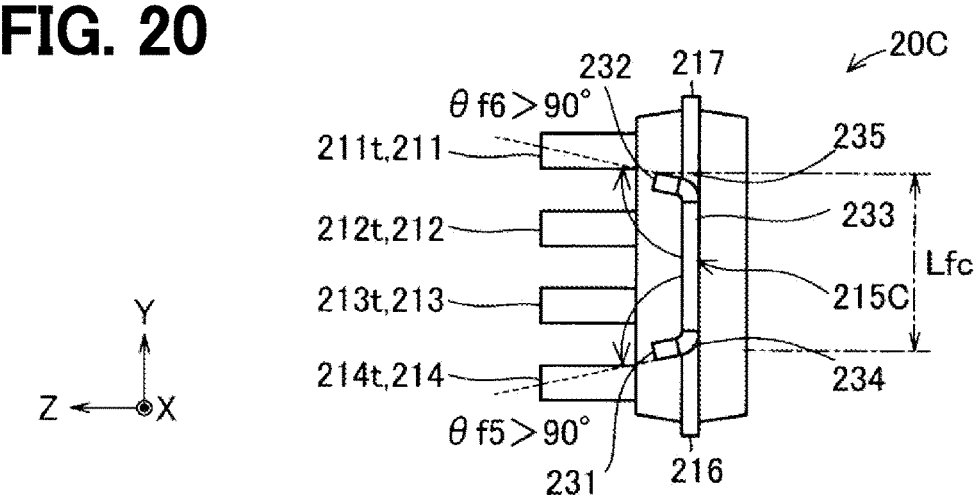
FIG. 20 is a right view of the formed sensor integrated circuit in FIG. 18.

The sensor IC 20C, as shown in FIGS. 18 to 20, includes a center portion 233 and two perpendicular distal end portions 231 and 232 as an opposite extending portion 215C. The two perpendicular distal end portions 231 and 232 are disposed on both sides of the center portion 233 in the Y direction. The two perpendicular distal end portions 231 and 232 that have not been formed have shapes separated from portions 234 and 235 of the opposite extending portion 215C with notches along the Y direction. The portions 234 and 235 of the opposite extending portion 215C protrude from the exterior 22 in the Y direction. Thus, the two perpendicular distal end portions 231 and 232 can be bent toward the center portion 233.

In step S10 (see FIG. 3), the perpendicular distal end portions 231 and 232 are bent such that the perpendicular distal end portions 231 and 232 is located on the +Z side of the center portion 233 and an angle θf5 between the center portion 233 and the perpendicular distal end portion 231 and an angle θf6 between the center portion 233 and the perpendicular distal end portion 232 are obtuse angles. Specifically, a length Lfc between an outer end of the perpendicular distal end portion 231 and an outer end of the perpendicular distal end portion 232 shown in the side view of FIG. 20 is set to a value longer than a length Lbc between a wall surface 371 of the guide 37C and a wall surface 381 of the guide 38C. This is because to form the elastic structure at the perpendicular distal end portions 231 and 232.

As shown in FIG. 16, the guides 37C and 38C of the attachment member 30C is disposed such that the guides 37C and 38C are brought into contact with the perpendicular distal end portions 231 and 232 when the sensor IC 20C is attached to the attachment position 39C (see FIG. 16). The guides 37C and 38C are located in positions distanced from the portions 234 and 235 of the opposite extending portion 235C facing in the +Y direction.

In step S20 (see FIG. 3), as shown in FIGS. 16 and 17, the perpendicular distal end portions 231 and 232 are biased against the wall surfaces 371 and 381 of the guides 37C and 38C by the above-described elastic force from the elastic structure when the sensor IC 20C is press-fit between the guide 37C and the guide 38C and the sensor IC 20C is attached to the attachment position 39C. Thus, even if an amount of change in dimension between the perpendicular distal end portions 231 and 232 of the lead frame 21C is different from an amount of change in a distance between the guides 37C and 38C of the attachment member 30C, a backlash is restricted from generating and the sensor IC 20C can be fixed to the attachment position 39C. In addition, since the guides 37C and 38C are distanced from the portions 234 and 235 of the opposite extending portion 215C of the lead frame 21C that face in the +Y direction, stress applied to the sensor IC 20C caused by a thermal deformation of the lead frame 21C due to the temperature change can be suppressed.

D. Fourth Embodiment

A rotation angle sensor of a fourth embodiment is different from the rotation angle sensor 10C in that the rotation angle sensor has an opposite extending portion 215D having two perpendicular distal end portions 231D and 232D. The two perpendicular distal end portions 231D and 232D have shapes that are different from those of the perpendicular distal end portions 231 and 232 of the sensor IC 20C (see FIG. 18). Other portions are similar to those of the rotation angle sensor 10C.

Figure 21:
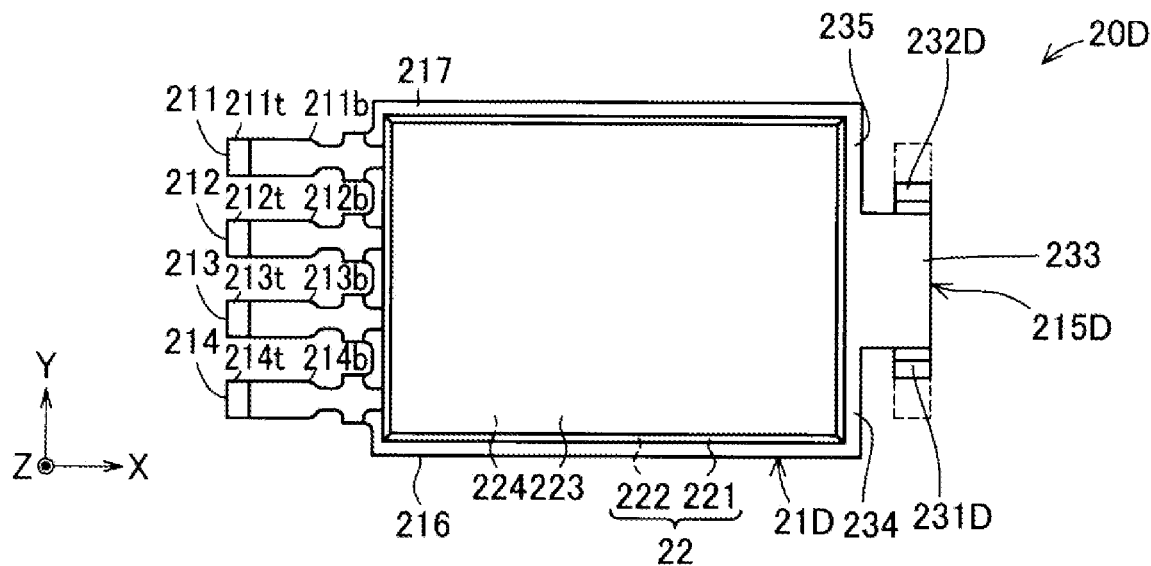
FIG. 21 is a plan view of a formed sensor integrated circuit of a fourth embodiment.

As shown in FIG. 21, the perpendicular distal end portions 231D and 232D are distanced from the portions 234 and 235 that protrude from the opposite extending portion 215D and face in the +Y direction, which is different from the perpendicular distal end portions 231C and 232C (see FIG. 18).

The fourth embodiment can obtain similar advantages as those of the third embodiment. As described above, the perpendicular distal end portions 231D and 232D are distanced from the portions 234 and 235 of the opposite extending portion 215D that protrude from the exterior 22 and faces in the +Y direction. Thus, a stress applied to the sensor IC 20D generated by a thermal deformation of the lead frame 21D due to the temperature change can be further effectively suppressed.

E. Fifth Embodiment

Figure 22:
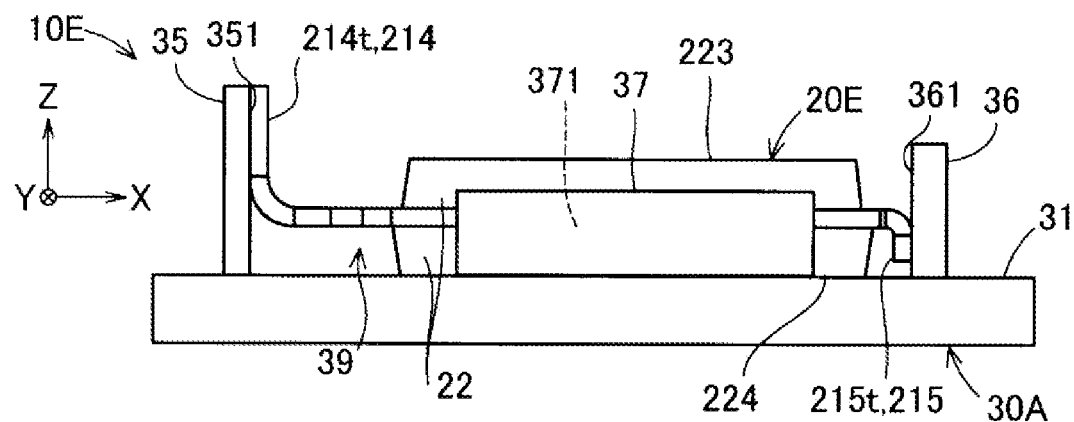
FIG. 22 is a front view of a rotation angle sensor of a fifth embodiment.
Figure 23:
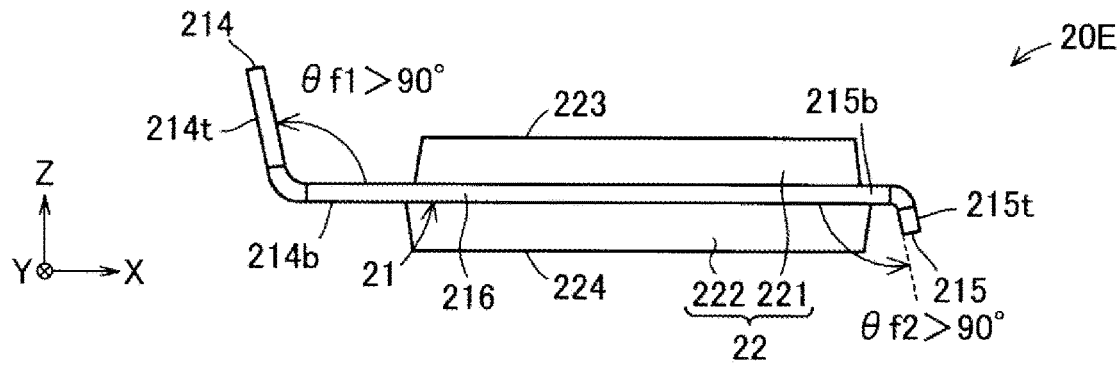
FIG. 23 is a front view of a formed sensor integrated circuit.

As shown in FIG. 23, a rotation angle sensor 10E of a fifth embodiment (see FIG. 22) is different from the rotation angle sensor 10A of the first embodiment (see FIG. 2) in that the opposite extending portion 215 of a sensor IC 20E is bent in a direction opposite to the direction in which the opposite extending portion 215 of the sensor IC 20A of the first embodiment is bent. That is, the opposite extending portion 215 of the sensor IC 20E is bent in the −Z direction that is opposite to the +Z direction. Other portions of the fifth embodiment are similar to those of the first embodiment. In the fourth embodiment, following advantages can be obtained in addition to the similar advantages to those of the first embodiment.

In the first embodiment, as described above, a phenomena that the sensor IC 20A is slipped out in the up direction (i.e., the +Z direction), i.e., a backlash, is restricted by the force that enters the distal end portion 215t of the opposite extending portion 215 into the wall surface 361 when the sensor IC 20A is attached. In the fifth embodiment, as shown in FIGS. 22 and 23, the opposite extending portion 215 of the sensor IC 20E is bent in the −Z direction. As a result, an elastic force of the elastic structure from the opposite extending portion 215 biases the distal end portion 215t of the opposite extending portion 215 and presses the sensor IC 20E downward (i.e., the −Z direction). Thus, the backlash can be restricted.

F. Sixth Embodiment

Figure 24:
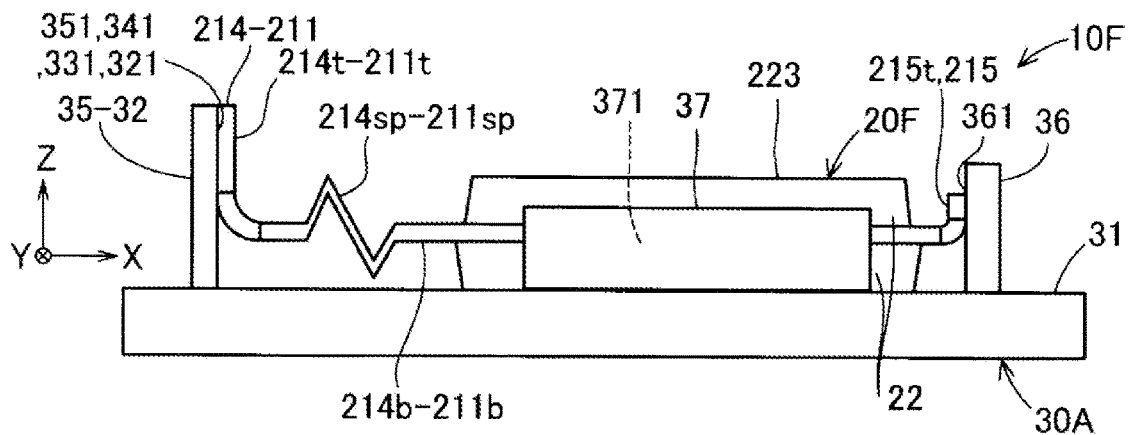
FIG. 24 is a front view of a rotation angle sensor of a sixth embodiment.

A rotation angle sensor 10D of a sixth embodiment is different from the rotation angle sensor 10A of the first embodiment (see FIG. 2) in that a sensor IC 20F has the leads 211-214 that have proximal end portions 211b-214b having spring structures 211sp-214sp as shown in FIG. 24. The spring structures 211sp-214sp generate an elastic force in the X direction. Other portions of the sixth embodiment are similar to those of the first embodiment. The spring structures 211sp-214sp are formed in step S10 (see FIG. 3) in which the leads 211-214 are formed.

The sixth embodiment can obtain advantages similar to those of the first embodiment. In addition to that, the spring structures 211sp-214sp can relieve the stress applied to the sensor IC 20F by being deformed even if the lead frame 21 is thermally deformed in the X direction due to change in the encompassing temperature.

G. Seventh Embodiment

Figure 25:
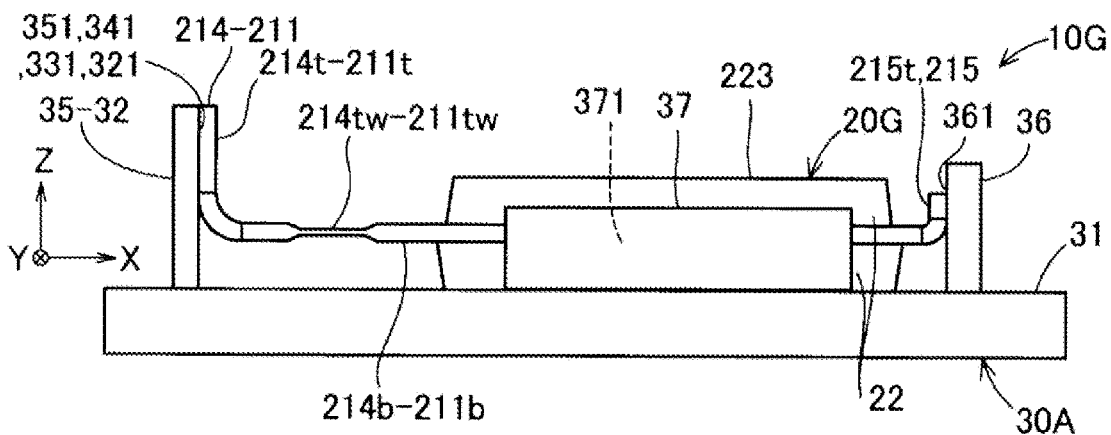
FIG. 25 is a front view of a rotation angle sensor of a seventh embodiment.

As shown in FIG. 25, a rotation angle sensor 10G of a seventh embodiment is different from a rotation angle sensor 10A of the first embodiment in that the leads 211-214 of a sensor IC 20G have proximal end portions 211b-216b having thin portions 211tw-214wt. Other portions of the seventh embodiment are similar to those of the first embodiment. The thin portions 211tw-214tw are formed by cutting the leads 211-214 in step S10 (see FIG. 3).

The seventh embodiment can obtain the advantages similar to those of the first embodiment. In addition to this, the thin portions 211tw-214tw can relieve a stress applied to the sensor IC 20G by being deformed even if the lead frame 21 is thermally deformed in the X direction due to a change in the encompassing temperature.

H. Eighth Embodiment

Figure 26:
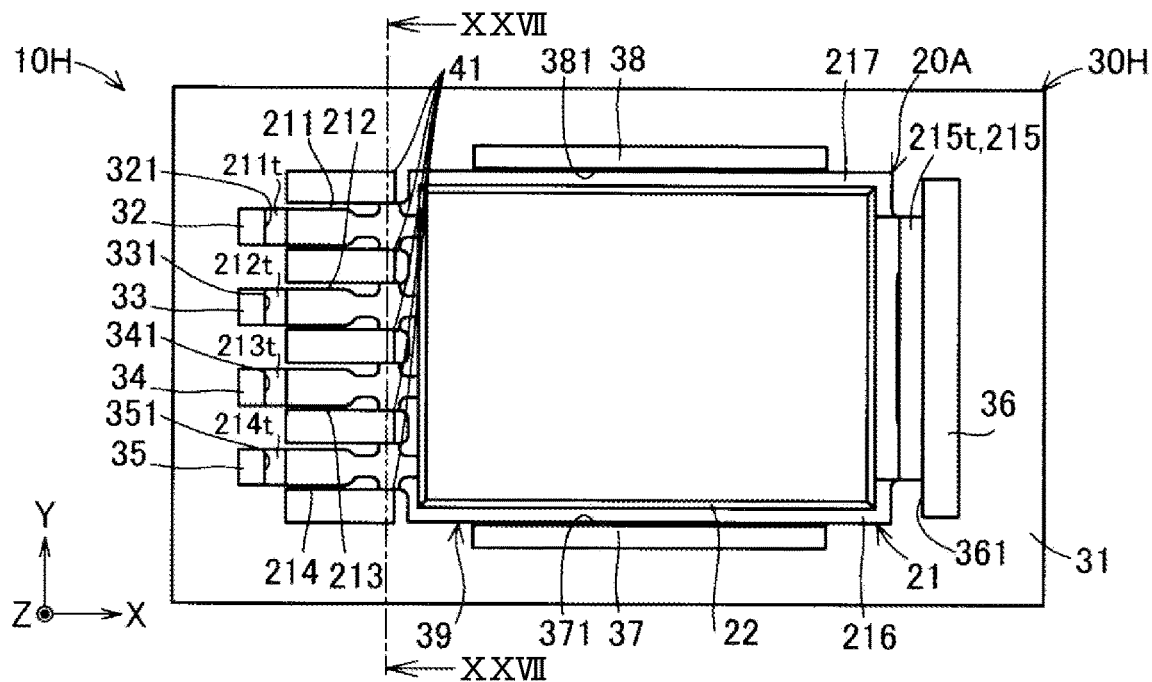
FIG. 26 is a front view of a rotation angle sensor of an eighth embodiment.
Figure 27:
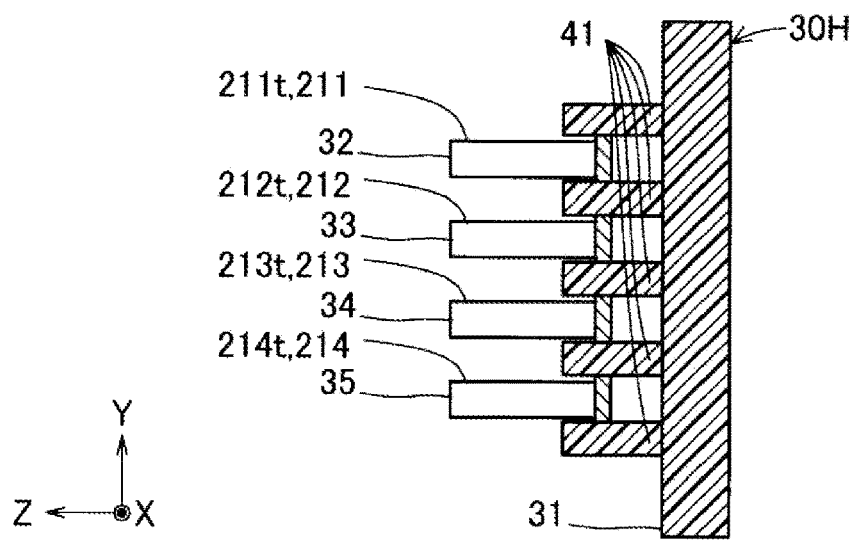
FIG. 27 is a cross-sectional view of the rotation angle sensor taken along a line XXVII-XXVII in FIG. 26.

A rotation angle sensor 10H of an eighth embodiment is different from the rotation angle sensor 10A (see FIGS. 1 and 2) in that the rotation angle sensor 10H has an attachment member 30H having partition walls 41. As shown in FIGS. 26 and 27, each of the partition walls 41 is disposed between adjacent ones of the leads 211-214 of the sensor IC 20A of the attachment member 30A (See FIGS. 1 and 2). Other portions of the eighth embodiment are similar to those of the first embodiment.

The eighth embodiment can obtain advantages similar to those of the first embodiment. In addition to this, the partition walls 41 can restrict debris of the lead frame 21, which is generated when the sensor IC is press-fitted, from adhering to the leads 211-214 and restrict water from falling on the leads 211-214. As a result, the partition walls 41 can restrict short circuits between the leads 211-214.

I. Ninth Embodiment

Figure 28:
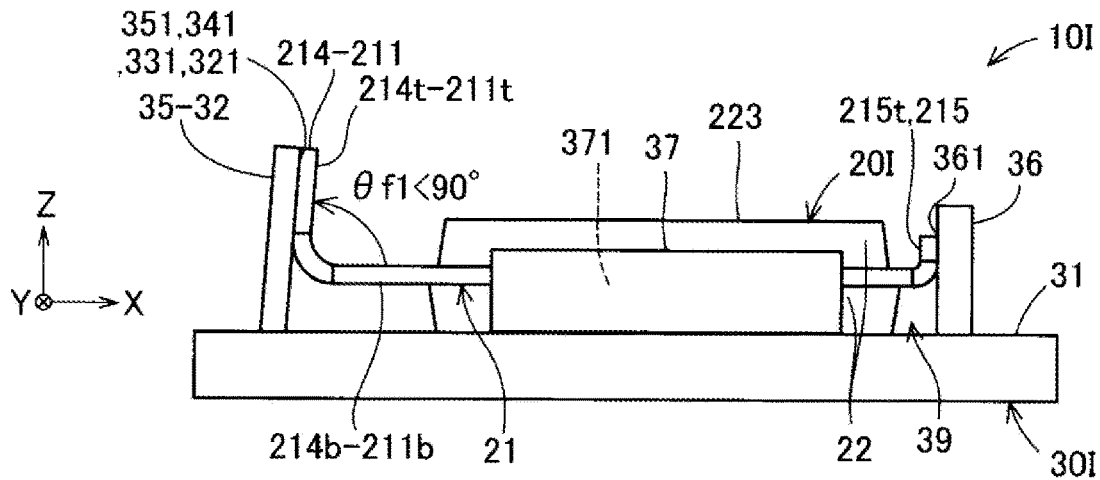
FIG. 28 is a front view of a rotation angle sensor of a ninth embodiment.

As shown in FIG. 28, a rotation angle sensor 10I of a ninth embodiment is different from the rotation angle sensor 10A (see FIG. 3) of the first embodiment in the following points. That is, in the rotation angle sensor 10I, the connecting terminals 32-35 are tilted toward the +X direction. The angle θf1 between the distal end portions 211t-214t and the proximal end portions 211b-214b of the leads 211-214 of the sensor IC 20l that are connected to the connecting terminals 32-35 is an acute angle (<90°).

Figure 29:
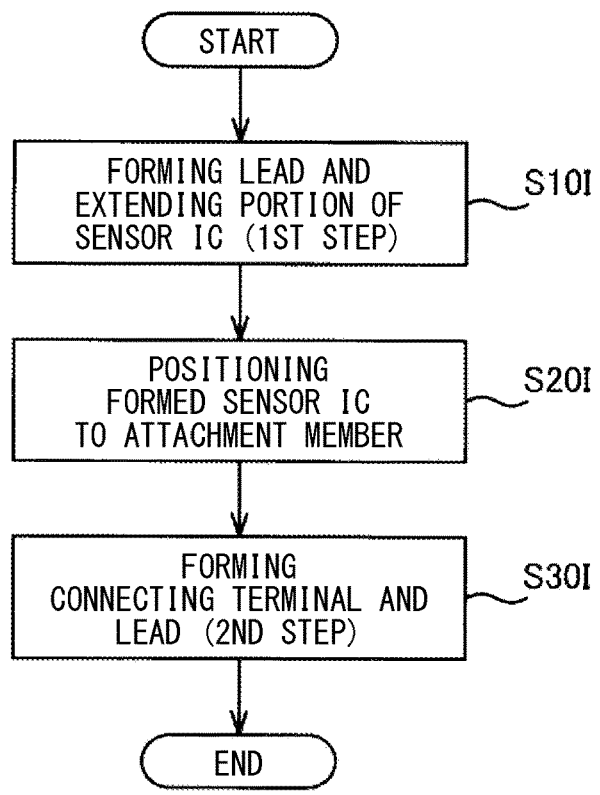
FIG. 29 is a flow chart of steps of manufacturing the rotation angle sensor.
Figure 30:
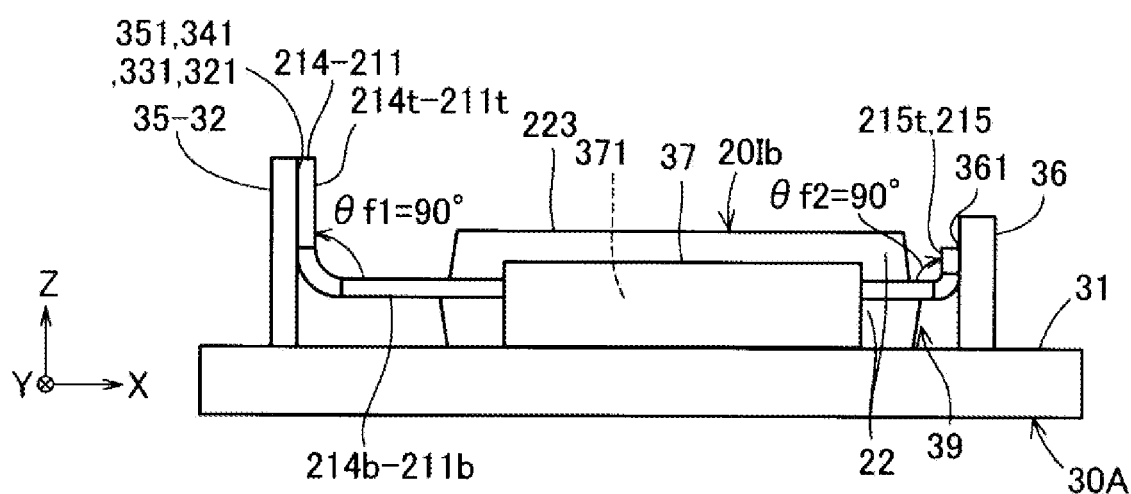
FIG. 30 is a front view of a rotation angle sensor before an elastic structure is formed.

As shown in FIG. 29, the rotation angle sensor 10I is manufactured in accordance with step S10I to step S30I. In step S10I, a first forming is performed for the leads 211-214 of the sensor IC 20Ab (see FIG. 5) and the opposite extending portion 215. Specifically, as shown in FIG. 30, the leads 211-214 and the opposite extending portion 215 are bent such that the distal end portions 211t-214t are brought into contact with the connecting terminals 32-35 and the distal end portion 215t of the opposite extending portion 215 is brought into contact with the wall surface 361 of the guide 36. Unlike the formed sensor IC 20A shown in FIG. 7, the angles θf1 and θf2 are not necessary obtuse angles. In this embodiment, θf1=90°, θf2=90°, and Lf (see FIG. 7)=Lb (see FIG. 9).

Next, in step S20l in FIG. 29, as shown in FIG. 30, the sensor IC 20lb after the first forming is positioned at the attachment position 39 of the attachment member 30A.

In step S30I in FIG. 29, a second forming is performed for the connecting terminals 32-35 and the distal end portions 211t-214t of the leads 211-214 connected to the connecting terminals 32-35. Specifically, as shown in FIG. 28, the connecting terminals 32-35 and the distal end portions 211t-214t of the lead are formed such that the connecting terminals 32-35 are tilted toward the +X direction and the angle θf1 between the distal end portions 211t-214t of the leads 211-214 connected to the connecting terminals 32-35 and the proximal end portions 211b-214b is an acute angle. As a result, an elastic structure that generates an elastic force biasing the distal end portions 211t-214t of the leads 211-214 against the terminal surfaces 321, 331, 341 of the connecting terminals 32-35 and biasing the distal end portion 215t of the opposite extending portion 215 against the wall surface 361 of the guide 36. Thus, as with the first embodiment, a backlash is restricted and the sensor IC 20I can be fixed to the attachment position 39 of the attachment member 30l.

The acute angle θf1 is preferably a value that can generate an elastic force even if a deformation occurs due to a difference of the liner expansion coefficients between the attachment member 30I and the lead frame 21 of the sensor IC 20I.

J. Other Embodiments (1) In the above described embodiments, the sensor IC has the four leads, but the number of the leads is not limited. Additionally, the sensor IC has three extending portions on the three peripheral side surfaces of the four peripheral side surfaces of the exterior that are the side surface opposite to the surface on which the leads are disposed and the side surfaces perpendicular to the surface on which the leads are disposed. However, the present disclosure is not limited to this. The extending portion that does not have the elastic structure is not always necessarily.

(2) In the first embodiment, the elastic structures are disposed in both of the leads 211-214 and the opposite extending portion 215 that are disposed opposite with each other relative to the exterior 22. However, it is enough that at least one of the leads 211-214 and the opposite extending portion 215 has the elastic structure.

(3) In the second embodiment, the elastic structures are disposed in the leads 211-214, the opposite extending portion 215, and the perpendicular protruding portions 218, 219 of the perpendicular extending portion 216, 217. However, the present disclosure is not limited to this. In the case the perpendicular extending portions 216, 217 have the elastic structure, the leads 211-214 may not have the elastic structures and may be bent such that the distal end portions 211t-214t are in contact with the wall surfaces 321, 331, 341, 351 of the connecting terminals 32-35. The same applies to the opposite extending portion 215. Further, bending formation may be omitted for the opposite extending portion 215.

(4) In the sixth embodiment, the spring structures 211sp-214sp are disposed in the leads 211-214 of the sensor IC 20A of the first embodiment. In the seventh embodiment, the thin portions 211tw-214tw are disposed in the leads 211-214 of the sensor IC 20A of the first embodiment. However, the present disclosure is not limited to this and the spring structures 211sp-214sp and the thin portions 211tw-214tw can be applied for the leads 211-214 of the second to fifth, eighth, and ninth embodiments.

(5) In the rotation angle sensor 10H of the eighth embodiment, the partition walls 41 each of which is disposed between adjacent ones of the leads 211-214 of the sensor IC 20A of the rotation angle sensor 10A in the first embodiment. However, the present disclosure is not limited to this, and the partition walls 41 of the eighth embodiment can be applied for the leads 211-214 of the second to seventh, and ninth embodiment.

It should be appreciated that the present disclosure is not limited to the embodiments described above and can be modified appropriately within the scope of the appended claims. For example, the technical features of the embodiments can be appropriately replaced and modified to solve a part or all parts of the above-described subjects or to solve a part or all parts of the effects. Additionally, the technical features can be appropriately deleted as long as the technical features are described to be essential in the specification.

What is claimed is:

1. A rotation angle sensor configured to detect a rotation angle of a shaft, the rotation angle sensor comprising:
    an attachment member; and
    a sensor integrated circuit attached to an attachment surface of the attachment member, wherein
    the attachment member includes:
        a connecting terminal protruding upward from the attachment surface; and
        a guide protruding upward from the attachment surface and configured to position, together with the connecting terminal, the sensor integrated circuit at an attachment position,
    the sensor integrated circuit includes:
        a lead frame on which an electronic circuit for detecting the rotation angle is mounted; and
        an exterior that covers the electronic circuit,
    the lead frame includes:
        a lead configured to guide a terminal of the electronic circuit from an inside to an outside of the exterior; and
        an extending portion located in at least a portion of an outer periphery of the exterior,
    at least one of the lead and the extending portion has an elastic structure, and
    the sensor integrated circuit is attached to the attachment member by an elastic force generated from the elastic structure that biases a portion of the extending portion against the guide and that joins the lead to the connecting terminal, wherein
    the lead has a distal end portion and a proximal end portion, the lead has the elastic structure such that:
  the distal end portion of the lead is bent toward an upper surface of the sensor integrated circuit to define an obtuse angle between the distal end portion and the proximal end portion when the sensor integrated circuit is not positioned at the attachment position; and
  the distal end portion of the lead is biased against a wall surface of the connecting terminal when the sensor integrated circuit is positioned at the attachment position,
the extending portion includes an opposite extending portion protruding from the exterior in a protruding direction opposite to an extending direction of the lead,
the opposite extending portion has a distal end portion and a proximal end portion, and
the extending position has the elastic structure such that:
  the distal end portion of the opposite extending portion is bent toward the upper surface of the sensor integrated circuit to define an obtuse angle between the distal end portion and the proximal end portion of the extending portion when the sensor integrated circuit is not positioned at the attachment position; and
  the distal end portion of the opposite extending portion is biased against a wall surface of the guide when the sensor integrated circuit is positioned at the attachment position.

2. The rotation angle sensor according to claim 1, wherein the distal end portion of the lead is joined to the wall surface of the connecting terminal and bent toward the upper surface of the sensor integrated circuit when the sensor integrated circuit is positioned at the attachment position,
the extending portion includes:
  a perpendicular extending portion protruding from the exterior in a direction perpendicular to the protruding direction,
the perpendicular extending portion includes a distal end portion and a proximal end portion, and
the extending portion has the elastic structure such that:
  the distal end portion of the perpendicular extending portion is bent toward the upper surface of the sensor integrated circuit to define an obtuse angle between the distal end portion and the proximal end portion of the perpendicular extending portion when the sensor integrated circuit is not positioned at the attachment position; and
  the distal end portion of the perpendicular extending portion is biased against the wall surface of the guide when the sensor integrated circuit is positioned at the attachment position.

3. The rotation angle sensor according to claim 1, wherein the extending portion includes a perpendicular extending portion protruding from the exterior in a direction perpendicular to the protruding direction of the opposite extending portion,
the perpendicular extending portion has a distal end portion and a proximal end portion, and
the extending portion has the elastic structure such that:
  the distal end portion of the perpendicular extending portion is bent toward the upper surface of the sensor integrated circuit to define an obtuse angle between the distal end portion and the proximal end portion of the perpendicular extending portion when the sensor integrated circuit is not positioned at the attachment position; and
  the distal end portion of the perpendicular extending portion is biased against the wall surface of the guide when the sensor integrated circuit is positioned at the attachment position.

4. The rotation angle sensor according to claim 1, wherein a proximal end portion of the lead has a spring structure.

5. The rotation angle sensor according to claim 1, wherein a proximal end portion of the lead has a thin portion.

6. The rotation angle sensor according to claim 1, wherein the lead includes a plurality of leads, and
the attachment member includes a partition wall that is disposed between adjacent ones of the plurality of leads when the sensor integrated circuit is positioned at the attachment position.

7. A method for manufacturing a rotation angle sensor configured to detect a rotation angle of a shaft, the rotation angle sensor including:
  an attachment member; and
  a sensor integrated circuit attached to the attachment member, wherein
  the attachment member has an attachment surface to which the sensor integrated circuit is attached and includes:
    a connecting terminal that protrudes upward from the attachment surface; and
    a guide that protrudes upward from the attachment surface and is configured to position, together with the connecting terminal, the sensor integrated circuit at an attachment position,
  the sensor integrated circuit includes:
    a lead frame on which an electronic circuit for detecting the rotation angle is mounted; and
    an exterior that covers the electronic circuit,
  the lead frame includes:
    a lead configured to guide a terminal of the electronic circuit from an inside to an outside of the exterior; and
    an extending portion located in at least a portion of an outer periphery of the exterior,
  the method comprising:
    (a) a forming step of forming an elastic structure at at least one of the lead and the extending portion; and
    (b) an attachment step of setting the sensor integrated circuit at the attachment position on the attachment surface such that a lower surface of the sensor integrated circuit is brought into contact with the attachment surface whereby the extending portion is biased against the guide and the lead is joined to the connecting terminal by an elastic force generated when the elastic structure is deformed, wherein
  the extending portion includes an opposite extending portion protruding from the exterior in a protruding direction opposite to an extending direction of the lead,
  (a) the forming step includes:
    forming the elastic structure at a distal end portion of the lead by bending the distal end portion of the lead toward an upper surface of the sensor integrated circuit to define an obtuse angle between the distal end portion and a proximal end portion of the lead; and
    forming the elastic structure at a distal end portion of the opposite extending portion by bending the distal end portion of the opposite extending portion toward the upper surface of the sensor integrated circuit to define an obtuse anele between the distal end portion and a proximal end portion of the opposite extending portion, and b) the attachment step further includes setting the sensor integrated circuit at the attachment position on the attachment surface such that the lower surface of the sensor integrated circuit is brought into contact with the attachment surface whereby the opposite extending portion is biased against a wall surface of the guide, the distal end portion of the lead is biased against the connecting terminal, and the distal end portion of the lead is joined to the connecting terminal by the elastic force generated when the elastic structure is deformed.

8. The method for manufacturing the rotation angle sensor according to claim 7, wherein the extending portion includes a perpendicular extending portion protruding from the exterior in a direction perpendicular to the protruding direction, (a) the forming step includes:

bending a distal end portion of the lead toward the upper surface of the sensor integrated circuit to brought into contact with a wall surface of the connecting terminal when the sensor integrated circuit is positioned at the attachment position; and forming the elastic structure at a distal end portion of the perpendicular extending portion by bending the distal end portion of the perpendicular extending portion toward the upper surface of the sensor integrated circuit to define an obtuse angle between the distal end portion and a proximal end portion of the perpendicular extending portion, and the attachment step further includes setting the sensor integrated circuit at the attachment position on the attachment surface such that the lower surface of the sensor integrated circuit is brought into contact with the attachment surface whereby the distal end portion of the perpendicular extending portion is biased against the wall surface of the guide and the distal end portion of the lead is joined to the connecting terminal by the elastic force generated when the elastic structure is deformed.

9. The method for manufacturing the rotation angle sensor according to claim 7, wherein the extending portion includes a perpendicular extending portion protruding from the exterior in a direction perpendicular to the protruding direction of the opposite extending portion, (a) the forming step includes forming the elastic structure at a distal end portion of the perpendicular extending portion by bending the distal end portion of the perpendicular extending portion toward the upper surface of the sensor integrated circuit to define an obtuse angle between the distal end portion and a proximal end portion of the perpendicular extending portion, and the attachment step includes setting the sensor integrated circuit at the attachment position on the attachment surface such that the lower surface of the sensor integrated circuit is brought into contact with the attachment surface whereby the distal end portion of the perpendicular extending portion is biased against the wall surface of the guide, the distal end portion of the lead is biased against the connecting terminal, and the distal end portion of the lead is joined to the connecting terminal by the elastic force generated when the elastic structure is deformed.

10. A method for manufacturing a rotation angle sensor configured to detect a rotation angle of a shaft, the rotation angle sensor including:

an attachment member; and a sensor integrated circuit attached to the attachment member, wherein the attachment member has an attachment surface to which the sensor integrated circuit is attached and includes:

a connecting terminal that protrudes upward from the attachment surface; and a guide that protrudes upward from the attachment surface and configured to position, together with the connecting terminal, the sensor integrated circuit at an attachment position, the sensor integrated circuit includes:

a lead frame on which an electronic circuit for detecting the rotation angle is mounted; and an exterior that covers the electronic circuit, the lead frame includes:

a lead configured to extend a terminal of the electronic circuit from an inside to an outside of the exterior; and an extending portion located in at least a portion of an outer periphery of the exterior, the method comprising:

(a) a bending step of bending a distal end portion of the lead toward an upper surface of the sensor integrated circuit such that the distal end portion of the lead is brought into contact with a wall surface of the connecting terminal when the sensor integrated circuit is positioned at the attachment position;

(b) a positioning step of setting the sensor integrated circuit at the attachment position on the attachment surface such that a lower surface of the sensor integrated circuit faces the attachment surface and the distal end portion of the lead is brought into contact with the connecting terminal; and (c) a bending step of bending the connecting terminal and the distal end portion of the lead to define an acute angle between the distal end portion and a proximal end portion of the lead while the connecting terminal is being in contact with the distal end portion of the lead whereby the distal end portion of the lead is biased against the connecting terminal and the lead is joined to the connecting terminal by an elastic force generated when the distal end portion of the lead is bent.

* * * * *